United States Patent
Dage et al.

(10) Patent No.: US 6,640,890 B1
(45) Date of Patent: Nov. 4, 2003

(54) MULTIPLE ZONE AUTOMATIC HVAC CONTROL SYSTEM AND METHOD

(75) Inventors: Gerhard Allen Dage, Franklin, MI (US); Hilton W. Girard, Roseville, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 31 days.

(21) Appl. No.: 09/587,428

(22) Filed: Jun. 5, 2000

Related U.S. Application Data

(63) Continuation-in-part of application No. 09/469,706, filed on Dec. 22, 1999, now abandoned.

(51) Int. Cl.$^7$ .............................. B60H 3/00; F24F 7/00
(52) U.S. Cl. ......................... 165/203; 165/42; 165/43; 236/49.3; 236/91 C; 236/91 F; 701/36; 706/4
(58) Field of Search .......................... 165/203, 42, 43, 165/202, 247, 249, 291, 201, 204; 236/49.3, 91 C, 91 F; 701/36; 706/4

(56) References Cited

U.S. PATENT DOCUMENTS

| | | | |
|---|---|---|---|
| 4,537,245 A | * 8/1985 | Nishimura et al. | 165/43 |
| 4,762,169 A | * 8/1988 | Andersen et al. | 165/43 |
| 4,794,537 A | * 12/1988 | Adasek et al. | 237/5 |
| 5,101,883 A | * 4/1992 | Kinmartin et al. | 165/43 |
| 5,186,237 A | * 2/1993 | Adasek et al. | 165/42 |
| 5,275,012 A | * 1/1994 | Dage et al. | 62/239 |
| 5,335,514 A | * 8/1994 | Hennessee et al. | 62/209 |
| 5,427,313 A | * 6/1995 | Davis, Jr. et al. | 236/49.3 |
| 5,549,152 A | * 8/1996 | Davis, Jr. et al. | 165/201 |
| 5,579,994 A | * 12/1996 | Davis, Jr. et al. | 236/91 C |
| 5,642,467 A | * 6/1997 | Stover et al. | 395/85 |
| 5,653,386 A | * 8/1997 | Hennessee et al. | 237/12.3 B |
| 5,755,378 A | * 5/1998 | Dage et al. | 236/91 C |
| 5,833,133 A | * 11/1998 | Dage | 165/204 |
| 5,862,677 A | * 1/1999 | Kim et al. | 165/42 |
| 5,937,940 A | * 8/1999 | Davis, Jr. et al. | 165/202 |
| 5,974,350 A | * 10/1999 | Davis, Jr. et al. | 701/36 |
| 5,975,422 A | * 11/1999 | Ordberg | 237/2 A |
| 5,988,517 A | * 11/1999 | Bauer et al. | 236/49.3 |
| 6,052,998 A | * 4/2000 | Dage et al. | 62/178 |
| 6,275,231 B1 | * 8/2001 | Obradovich | 701/36 |

FOREIGN PATENT DOCUMENTS

| | | | | |
|---|---|---|---|---|
| DE | 3514359 | * | 10/1986 | 165/203 |
| EP | 000600778 | * | 6/1994 | 165/43 |
| JP | 56-2213 | * | 4/1981 | |
| JP | 0109420 | * | 6/1984 | 454/156 |
| JP | 0125911 | * | 6/1987 | 165/203 |
| JP | 0247210 | * | 10/1989 | 165/43 |
| JP | 0010922 | * | 1/1991 | 237/5 |
| JP | 4040786 | * | 3/1992 | 237/5 |
| JP | 404310417 | * | 11/1992 | 237/5 |
| JP | 405058144 | * | 3/1993 | 165/203 |
| JP | 10-138735 | * | 5/1998 | 165/203 |
| WO | WO 96/29211 | * | 9/1996 | |

OTHER PUBLICATIONS

Campbell Scientific, Inc., "Measurement and Control Peripherals", Feb. 25, 1998.
Keithley Instruments, Inc., Smartlink Products, "New SmarkLink™ Miniaturized Instruments for Precision RTD Temperature Measurements", Jun. 8, 1998.

* cited by examiner

*Primary Examiner*—John K. Ford
(74) *Attorney, Agent, or Firm*—Daniel J. Sepanik

(57) ABSTRACT

A multiple zone electronic control system and method are provided to control a heating, ventilation and air conditioning (HVAC) system for a vehicle. The control system includes a plurality of sensors to provide inputs relating to multiple zones of an occupant compartment of the vehicle and a plurality of buttons to provide manual inputs relating to the multiple zones. The control system also includes a plurality of mechanisms to control temperature and flow of air from the HVAC system into the multiple zones. The control system further includes a controller electrically connected to the sensors and the buttons to receive the inputs therefrom and electrically connected to the mechanisms to control the temperature and flow of air into each of the multiple zones.

6 Claims, 3 Drawing Sheets

MULTIPLE ZONE AUTOMATIC HVAC CONTROL SYSTEM AND METHOD

CROSS-REFERENCE TO RELATED APPLICATION(S)

This is a Continuation-In-Part (CIP) of U.S. Ser. No. 09/469,706, filed on Dec. 22, 1999, now abandoned.

BACKGROUND OF THE INVENTION

1. Field of the Invention

The present invention relates generally to electronic control systems and, more specifically, to a multiple zone automatic heating, ventilation and air conditioning (HVAC) control system and method of automatically controlling a HVAC system.

2. Description of the Related Art

It is known to provide an electronic control system for automatically controlling a HVAC system in a vehicle. Typically, a single zone automatic control system is used to control a HVAC system in a vehicle. However, it is desirable to provide an electronic control system that automatically controls multiple zones for a HVAC system.

SUMMARY OF THE INVENTION

Accordingly, the present invention is a multiple zone electronic control system is provided to control a heating, ventilation and air conditioning (HVAC) system for a vehicle. The control system includes a plurality of sensors to provide inputs relating to multiple zones of an occupant compartment of the vehicle and a plurality of buttons to provide manual inputs relating to the multiple zones. The control system also includes a plurality of mechanisms to control temperature and flow of air from the HVAC system into the multiple zones. The control system further includes a controller electrically connected to the sensors and the buttons to receive the inputs therefrom and electrically connected to the mechanisms to control the temperature and flow of air into each of the multiple zones.

One advantage of the present invention is that a multiple zone electronic control system is provided to control a HVAC system of a vehicle. Another advantage of the present invention is that the electronic control system includes a three zone automatic HVAC controller to control a HVAC system including dual front (driver/passenger) automatic temperature control and full rear automatic temperature control (a/c, heater, temp, mode and blower control). Yet another advantage of the present invention is that the electronic control system receives inputs from a plurality of sensors such as a humidity sensor, sunload sensor, air quality sensor, etc. and provides outputs to a plurality of mechanisms such as actuators to move doors to control the air temperature and air flow.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
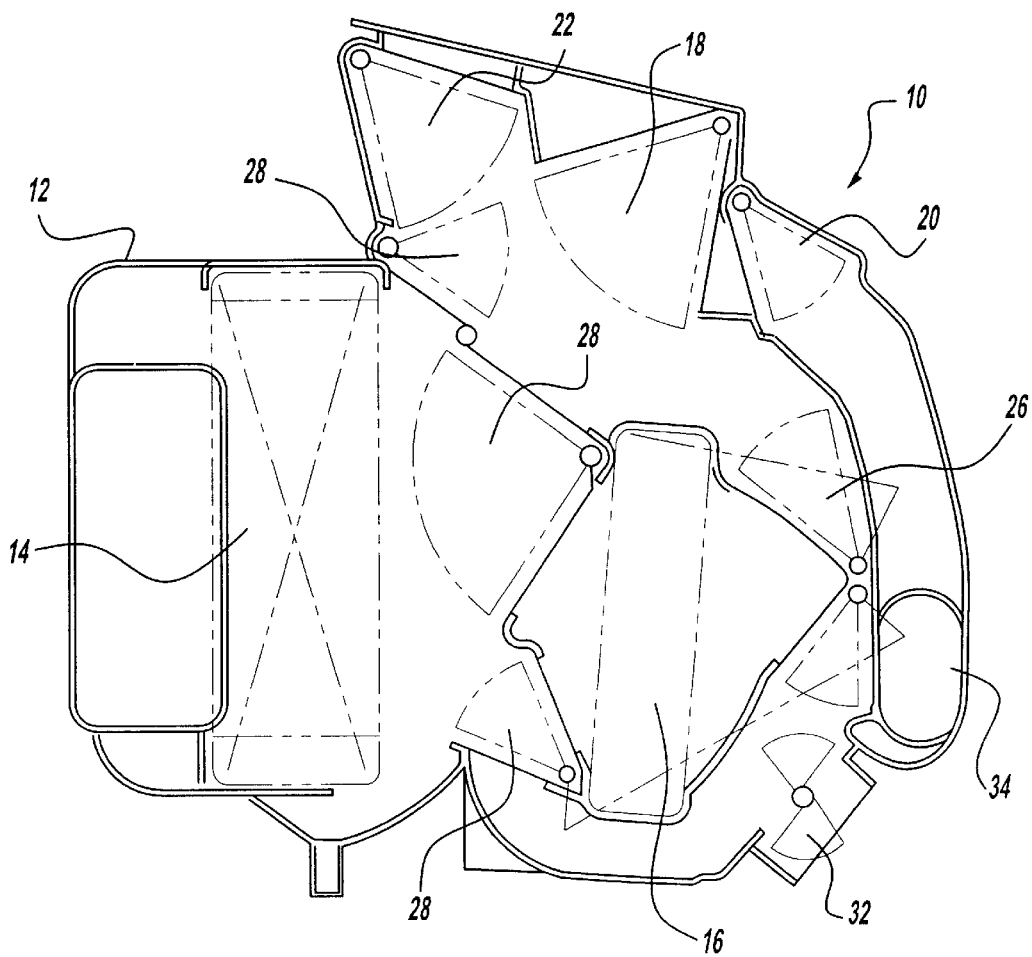
FIG. 1 is a diagrammatic view of a HVAC system for a vehicle controlled by a multiple zone electronic control system and method, according to the present invention.
Figure 2:
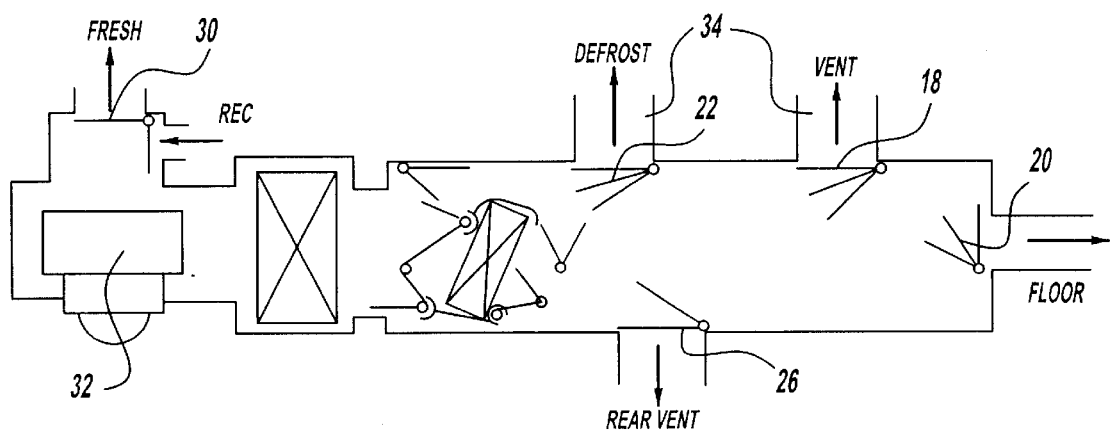
FIG. 2 is a schematic view of an air handling assembly of the HVAC system of FIG. 1 controlled by the multiple zone electronic control system and method, according to the present invention.

Referring to the drawings and in particular FIGS. 1 and 2, one embodiment of a heating, ventilation and air conditioning (HVAC) system 10 is illustrated. In general, control of air temperature and air flow (and, to a lesser extent, humidity) within a vehicle is accomplished using various actuators to affect the temperature and flow of air supplied to an interior or occupant compartment of a vehicle (not shown). The HVAC system 10 includes an HVAC case or housing 12. The HVAC system 10 also includes heating and cooling elements such as an evaporator core 14 and heater core 16 in a typical vehicle air conditioning plant including a compressor (not shown). The HVAC. system 10 further includes an arrangement of air flow doors, including vent, floor, defrost, rear temperature, rear vent, max cool, and fresh/recirculated air actuators or doors 18, 20, 22, 24, 26, 28 and 30, respectively. The doors 18 through 30 may be driven by vacuum motors (not shown) between their various vacuum, partial vacuum and no vacuum positions or by an electric servomotor (not shown) in a conventional manner. The HVAC system 10 also includes a variable speed blower motor or fan 32. Each of the above components is in communication with the HVAC case 12 and associated ducting 34 in order to control temperature, the direction of air flow and the ratio of fresh or intake air to recirculated air.

For automatic control of the temperature and flow of air in the occupant compartment or interior of the vehicle, a multiple zone electronic control system, generally indicated at 36 and according to the present invention, is provided. The multiple zone electronic control system 36 monitors conditions within and outside the occupant compartment and generates signals to control the plant actuators according to the conditions as indicated by the sensors. The evaporator temperature is controlled in a conventional automatic fashion to allow the HVAC system 10 to dehumidify air moving thereover.

Figure 3:
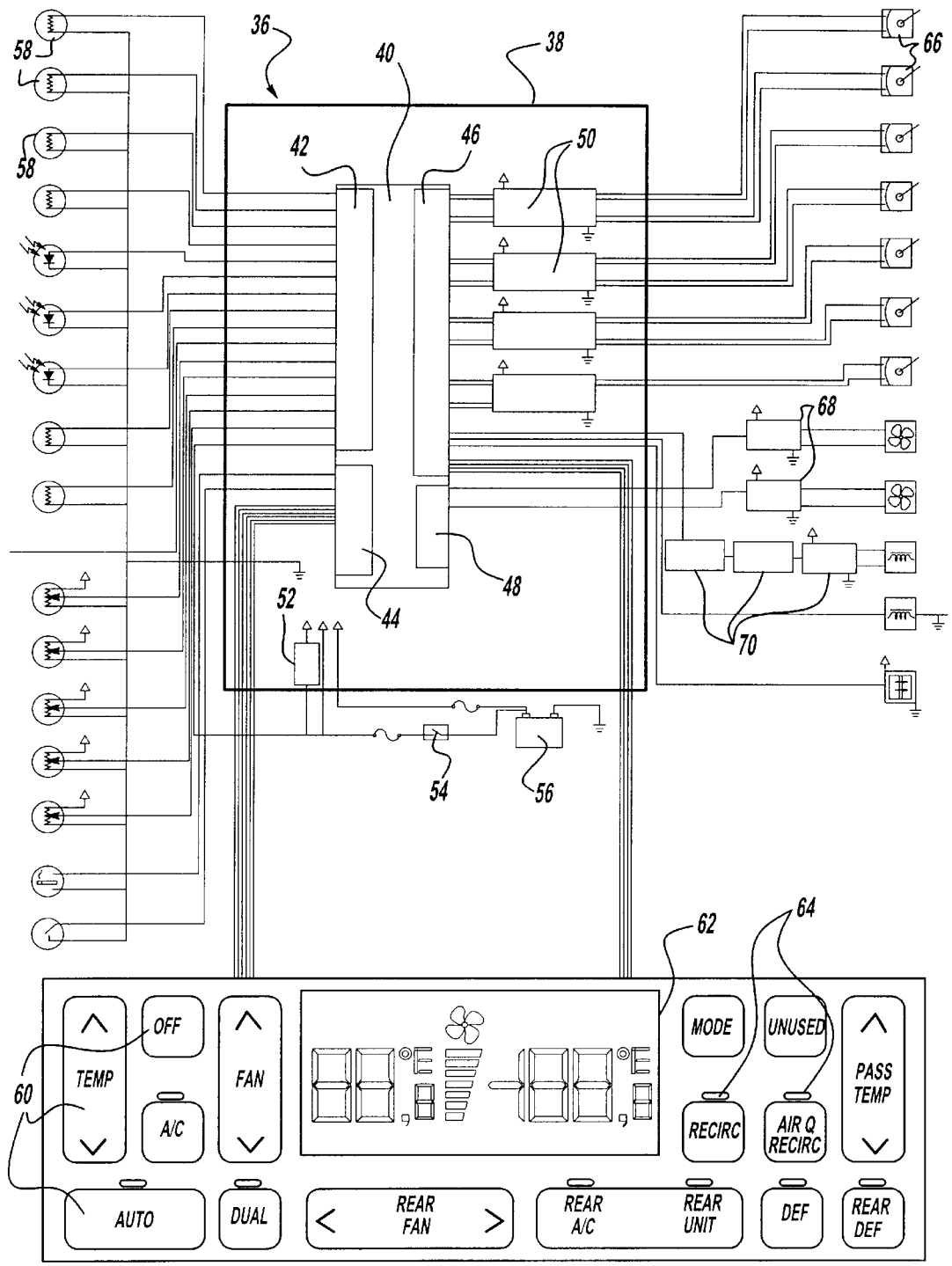
FIG. 3 is a schematic view of the electronic control system, according to the present invention, for controlling the HVAC system of FIG. 1.

As illustrated in FIG. 3, the multiple zone electronic control system 36 includes a controller 38. The controller 38 includes a microprocessor 40. The microprocessor 40 has an analog input section 42, digital input section 44, digital output section 46 and pulse width module (PWM) section 48 for a function to be described. The controller 38 also includes at least one, preferably a plurality of two channel motor driver integrated circuits 50 electrically connected to the digital output section 46 for a function to be described. The controller 38 includes a voltage regulator 52 such as a five volt regulator and is electrically connected to an ignition switch 54, which is in turn, electrically connected to a power source 56 such as a battery of the vehicle. It should be appreciated that the controller 38 is also electrically connected to the power source 56. It should also be appreciated that the controller 38 is also grounded as required. It should further be appreciated that the controller 38 preferably continually monitors the state of the ignition switch 54 and the state of the HVAC system 10.

The multiple zone electronic control system 36 also includes a plurality of sensors 58 for monitoring the HVAC system 10 and providing signals to the electronic controller 38 which are representative of interior (in-car) temperature, ambient (outside) air temperature, discharge air temperature (LH and RH duct), sunload (LH, RH, rear), evaporator outlet temperature, engine coolant (water) temperature (ECT), dimming, blend door position (LH, RH and rear), mode door position (LH and RH) and air quality. The sensors 58 are electrically connected to the analog section 42 of the controller 38. It should be appreciated that, except for the air quality sensor, the sensors 58 provide an analog input to the controller 38.

The multiple zone electronic control system 36 includes a plurality of buttons 60 set manually by the operator of the vehicle for the HVAC system 10 to provide signals to the controller 38 which are representative of power (off), desired temperature (temp), air conditioning (a/c), automatic control (auto), dual control (dual), fan, rear fan, rear air conditioning, rear unit, defrost (def), rear defrost, passenger temperature (pass. Temp), mode, recirculation (recirc) and air quality recirculation (air q. recirc). The buttons 60 are located in the occupant compartment of the vehicle and are electrically connected to the digital input section 44 of the controller 38. It should be appreciated that the buttons 60 provide a digital input to the controller 38.

The multiple zone electronic control system 36 also includes a display 62 to display information from the controller 38 such as temperature, mechanisms on or actuated, etc. The display 62 is electrically connected to the digital output section 46 of the controller 38. The display 62 may include a plurality of lights 64 such as light emitting diodes (LEDs) to indicate which buttons 60 are on.

The multiple zone electronic control system 36 also includes a plurality of mechanisms 66 such as actuators, motors, clutches and solenoids to control various components of the HVAC system 10 such as air flow doors, including blend (LH, RH), mode (LH, RH), fresh/recirculated air, rear vent, rear blend and blowers (front and rear) and a/c clutch. The mechanisms 66 are electrically connected to the digital output section 46 of the controller 38, except for the mechanisms 66 that are motors. The multiple zone electronic control system 36 may include PWM modules 68 electrically interconnecting the mechanisms 66 that are motors and the PWM output section 48 of the controller 38. The multiple zone electronic control system 36 may also include other components 70 such as a relay control module, powertrain control module and low pressure cutout electrically interconnecting the mechanism 66 which is the a/c clutch and the digital output section 46 of the controller 38. It should be appreciated that the controller 38 controls the doors 22 through 28 and the blower 32 to regulate the temperature and flow of air into the occupant compartment or passenger cabin of the vehicle.

Figure 4:
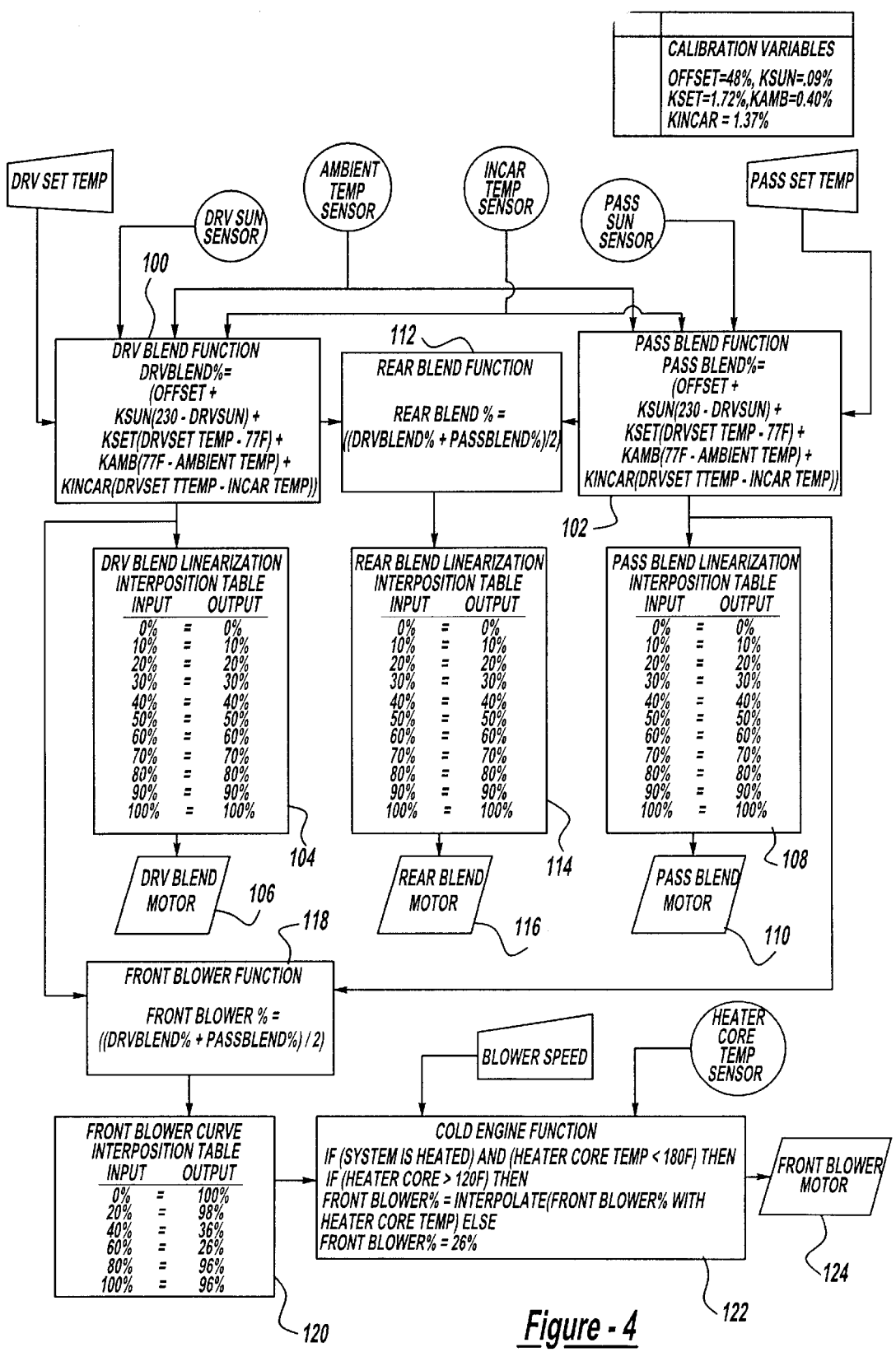
FIG. 4 is a flowchart of a method, according to the present invention, of automatically controlling the HVAC system of FIG. 1.

Referring to FIG. 4, a method, according to the present invention, of automatically controlling the HVAC system 10 with the multiple zone electronic controller is shown. In general, the method uses inputs from the sensors 58 and buttons 60 and provides outputs to the mechanisms 66 to control the temperature and flow of air into the occupant compartment of the vehicle. The method begins in either block 100 or block 102 to calculate the blend function for the driver side and passenger side respectively. In block 100, the method receives inputs of driver set temperature, driver sunload temperature, ambient temperature and interior temperature. The method calculates the percentage to move the driver blend motor, in turn, moving the driver (LH) blend door. The percentage is calculated as DrvBlend%=(Offset+Ksun(230−DrvSun)+Kset(DrvSetTemp−77° F.)+Kamb(77° F.−AmbientTemp)+Kincar(DrvSetTemp−IncarTemp). The variables have predetermined values such that Offset=48%, Ksun=0.09%, Kset=1.72%, Kamb=0.40% and Kincar=1.37%. The controller 38 receives these inputs from the sensors 58, calculates the percentage, and provides outputs to the corresponding mechanism 66. The method then advances to block 104 and determines an output for the mechanism 66 corresponding to the driver blend motor by using a driver blend linearization interpolation table stored in memory of the controller 38. The method then advances to block 106 and provides the output to the mechanism 66 for the driver blend motor. It should be appreciated that the mechanism 66 moves or rotates the blend door to the position corresponding to the output.

In block 102, the method receives inputs of passenger (RH) set temperature, passenger sunload temperature, ambient temperature and interior temperature. The method calculates the percentage to move the passenger blend motor, in turn, moving the passenger (RH) blend door. The percentage is calculated as PassBlend%=(Offset+Ksun(230−DrvSun)+Kset(DrvSetTemp−77° F.)+Kamb(77° F.−AmbientTemp)+Kincar(DrvSetTemp−IncarTemp). The variables have predetermined values such that Offset=48%, Ksun=0.09%, Kset=1.72%, Kamb=0.40% and Kincar=1.37%. The controller 38 receives these inputs from the sensors 58, calculates the percentage, and provides outputs to the corresponding mechanism 66. The method then advances to block 108 and determines an output for the mechanism 66 corresponding to the passenger blend motor by using a passenger blend linearization interpolation table stored in memory of the controller 38. The method then advances to block 110 and provides the output to the mechanism 66 for the passenger blend motor. It should be appreciated that the mechanism 66 moves or rotates the blend door to the position corresponding to the output.

From blocks 100 and 102, the method advances to block 112 and determines a rear blend function. The method calculates the percentage to move the passenger blend motor, in turn, moving the passenger (RH) blend door. The percentage is calculated as RearBlend%=((DrvBlend%+PassBlend%)/2). The controller 38 receives these inputs as previously calculated values, calculates the percentage, and provides outputs to the corresponding mechanism 66. The method then advances to block 114 and determines an output for the mechanism 66 corresponding to the rear blend motor by using a rear blend linearization interpolation table stored in memory of the controller 38. The method then advances to block 116 and provides the output to the mechanism 66 for the rear blend motor. It should be appreciated that the mechanism 66 moves or rotates the blend door to the position corresponding to the output.

From blocks 100 and 102, the method also advances to block 118 and determines a front blower function. The front blower function is calculated according to the equation of FrontBlower%=((DryBlend%+PassBlend%)/2). The controller 38 receives these inputs as previously calculated values, calculates the percentage, and provides outputs to the corresponding mechanism 66. The method then advances to block 120 and determines an output for the mechanism 66 corresponding to the front blower motor by using a front blower curve interpolation table stored in memory of the controller 38. The method advances to block 122 and determines a cold engine lockout function. In block 122, the method receives inputs of blower speed and heater core temperature from the corresponding sensors 58. The cold engine lockout function is calculated according to the equation if (system is heating) and (HeaterCoreTemp<180° F.) then FrontBlower% equals 26% or if (HeaterCoreTemp>120° F.) then the FrontBlower% equals Interpolate(FrontBlower% with HeaterCoreTemp). The method then advances to block 124 and provides the output to the mechanism 66 for the front blower motor. It should be appreciated that the mechanism 66 moves or rotates the front blower at the speed corresponding to the output. The method then ends. It should be appreciated that the method is continuously repeated once the multiple zone electronic control system 36 is on.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of automatically controlling a multiple zone heating, ventilation and air conditioning (HVAC) system for a vehicle, said method comprising the steps of:

receiving a plurality of sensed inputs from sensors relating to multiple zones of an occupant compartment of the vehicle comprising a driver side zone, a passenger side zone, and a rear zone;

receiving a plurality of manual inputs from buttons relating to the multiple zones;

calculating a driver side blend function, rear blend function and passenger side blend function wherein the rear blend function is a calculation based on the driver side blend function and the passenger side blend function and interpolating outputs based on a blend linear interpolation for each determined blend function;

outputting the interpolated outputs to mechanisms for the zones of the HVAC system to control temperature and flow of air from the HVAC system into the multiple zones; and controlling the temperature and flow of air into each of the multiple zones based on the received inputs and outputs to the mechanisms.

2. A method as set forth in claim 1 including the step of determining a blower function based on the determined blend function.

3. A method as set forth in claim 2 including the step of interpolating the output based on a blend linearization for the determined blower function.

4. A method as set forth in claim 3 wherein said step of outputting the interpolated output to the mechanism for a blower.

5. A method as set forth in claim 3 including the step of determining a cold engine function based on the interpolated output to the mechanism for a blower.

6. A method as set forth in claim 1 wherein said step of calculating the rear blend function is based on the driver side blend function plus the passenger side blend function divided by two.

\* \* \* \* \*